United States Patent
Yoon et al.

(10) Patent No.: US 12,283,181 B2
(45) Date of Patent: Apr. 22, 2025

(54) APPARATUS AND METHOD FOR CONTROLLING TRAFFIC SIGNALS OF TRAFFIC LIGHTS IN SUB-AREA BY USING REINFORCEMENT LEARNING MODEL

(71) Applicant: NOTA, INC., Daejeon (KR)

(72) Inventors: Jin Won Yoon, Iksan-si (KR); Seung Eon Baek, Incheon (KR); Seong Jin Lee, Seoul (KR)

(73) Assignee: NOTA, INC., Daejeon (KR)

( * ) Notice: Subject to any disclaimer, the term of this patent is extended or adjusted under 35 U.S.C. 154(b) by 260 days.

(21) Appl. No.: 17/870,138

(22) Filed: Jul. 21, 2022

(65) Prior Publication Data

US 2024/0013654 A1 Jan. 11, 2024

(30) Foreign Application Priority Data

Jul. 8, 2022 (KR) .......................... 10-2022-0084607

(51) Int. Cl.
*G08G 1/01* (2006.01)
*G06N 3/08* (2023.01)
(Continued)

(52) U.S. Cl.
CPC .............. *G08G 1/0125* (2013.01); *G06N 3/08* (2013.01); *G08G 1/08* (2013.01); *G08G 1/083* (2013.01)

(58) Field of Classification Search
CPC ........ G08G 1/0125; G08G 1/08; G08G 1/083; G06N 3/08
(Continued)

(56) References Cited

U.S. PATENT DOCUMENTS 4,167,784 A * 9/1979 McReynolds ............ G08G 1/08
700/83
5,257,194 A * 10/1993 Sakita .................... G08G 1/081
340/913

(Continued)

FOREIGN PATENT DOCUMENTS

| KR | 10-2029656 B1 | 11/2019 |
|---|---|---|
| KR | 10-2185101 B1 | 12/2020 |

(Continued)

OTHER PUBLICATIONS

Mingyu PI, et al., "Reinforcement Learning-based Traffic Signal Control under Real-World Constraints", Journal of KIISE, Aug. 2021, vol. 48, No. 8, pp. 871-877 (7 pages) https://doi.org/10.5626/JOK.2021.48.8.871.

(Continued)

*Primary Examiner* — Kerri L McNally
*Assistant Examiner* — Thang D Tran
(74) *Attorney, Agent, or Firm* — Sughrue Mion, PLLC (57) ABSTRACT

Provided are methods and apparatuses for controlling traffic signals of traffic lights in a sub-area by using a neural network model. The method according to an embodiment of the present disclosure may configure state information of a sub-area by using downstream information obtained in a current cycle time for each of a plurality of intersections included in the sub-area. In addition, the method may input the state information to a trained reinforcement learning model, and obtain action information of the sub-area including green times and offsets, by using an output from the trained reinforcement learning model. Furthermore, the method may generate coordinated signal values for applying the action to traffic lights in the sub-area in a subsequent cycle time.

12 Claims, 10 Drawing Sheets

(51) Int. Cl.
*G08G 1/08* (2006.01)
*G08G 1/083* (2006.01)

(58) Field of Classification Search
USPC .......................................................... 340/909
See application file for complete search history.

(56) References Cited

U.S. PATENT DOCUMENTS

| | | | | |
|---|---|---|---|---|
| 5,357,436 | A * | 10/1994 | Chiu | G08G 1/07 340/916 |
| 6,188,778 | B1 * | 2/2001 | Higashikubo | G08G 1/04 382/104 |
| 8,298,493 | B2 * | 10/2012 | Holl | F28F 13/02 422/198 |
| 12,125,380 | B2 * | 10/2024 | Eldessouki | G08G 1/0133 |
| 2011/0175753 | A1 * | 7/2011 | Free | G08G 1/08 901/50 |
| 2013/0099942 | A1 * | 4/2013 | Mantalvanos | G08G 1/082 340/910 |
| 2014/0139358 | A1 * | 5/2014 | Lee | G08G 1/092 340/907 |
| 2014/0210646 | A1 * | 7/2014 | Subramanya | B61L 29/28 348/148 |
| 2015/0066340 | A1 * | 3/2015 | Nelson | G08G 1/081 701/117 |
| 2015/0120175 | A1 * | 4/2015 | Vahidi | G08G 1/0141 701/119 |
| 2016/0027300 | A1 * | 1/2016 | Raamot | G08G 1/0145 340/922 |
| 2018/0286228 | A1 * | 10/2018 | Xu | G08G 1/0145 |
| 2019/0385447 | A1 * | 12/2019 | Marecek | G08G 1/04 |
| 2020/0035096 | A1 * | 1/2020 | Sun | G08G 1/095 |
| 2020/0042799 | A1 * | 2/2020 | Huang | G06V 10/764 |
| 2020/0096977 | A1 * | 3/2020 | Itou | G08G 1/081 |
| 2020/0139989 | A1 * | 5/2020 | Xu | B60W 30/18163 |
| 2020/0143206 | A1 * | 5/2020 | Kartal | G06N 3/08 |
| 2020/0192390 | A1 * | 6/2020 | Luo | G05D 1/0221 |
| 2020/0296741 | A1 * | 9/2020 | Ayala Romero | H04W 72/535 |
| 2020/0363814 | A1 * | 11/2020 | He | G06N 3/088 |
| 2021/0125076 | A1 * | 4/2021 | Zhang | G08G 1/0137 |
| 2021/0158690 | A1 * | 5/2021 | Lau | G08G 1/0112 |
| 2021/0174672 | A1 * | 6/2021 | Sakakibara | G08G 1/065 |
| 2021/0276594 | A1 * | 9/2021 | Oh | H04W 4/44 |
| 2021/0287534 | A1 * | 9/2021 | Savla | G08G 1/0116 |
| 2021/0348932 | A1 * | 11/2021 | Friedman | G08G 1/0112 |
| 2021/0397949 | A1 * | 12/2021 | Wang | H01M 4/04 |
| 2022/0076569 | A1 * | 3/2022 | Choi | G08G 1/095 |
| 2022/0076571 | A1 * | 3/2022 | Choi | G06V 20/54 |
| 2022/0138568 | A1 * | 5/2022 | Smolyanskiy | G06N 3/044 706/21 |
| 2022/0198925 | A1 * | 6/2022 | Mohamad Alizadeh Shabestary | G08G 1/08 |
| 2022/0270480 | A1 * | 8/2022 | Lee | G06N 3/088 |
| 2022/0327925 | A1 * | 10/2022 | Jackson | G08G 1/0175 |
| 2022/0398921 | A1 * | 12/2022 | Jaggi | G06N 3/092 |
| 2023/0134029 | A1 * | 5/2023 | Ogata | G08G 1/07 348/143 |
| 2023/0222905 | A1 * | 7/2023 | Xu | G08G 1/0112 340/913 |
| 2023/0351886 | A1 * | 11/2023 | Lee | G08G 1/0125 |

FOREIGN PATENT DOCUMENTS

| | | |
|---|---|---|
| KR | 10-2021-0122181 A | 10/2021 |
| KR | 10-2356738 B1 | 2/2022 |
| KR | 10-2385575 B1 | 4/2022 |
| KR | 10-2400833 B1 | 5/2022 |

OTHER PUBLICATIONS

S.Y. Jang, et al., "Research Trends on Deep Reinforcement Learning", Electronics and Telecommunications Trends, 2019, DOI: https://doi.org/10.22648/ETRI.2019.J.340401, pp. 1-14 (14 Pages).
Korean Office Action dated Dec. 5, 2022 in Application No. 10-2022-0084607.
Korean Office Action dated Jul. 20, 2023 in Application No. 10-2022-0084607.
Korean Office Action dated Jan. 17, 2023 in Application No. 10-2022-0084607.
Korean Office Action dated May 17, 2023 in Application No. 10-2022-0084607.

* cited by examiner

APPARATUS AND METHOD FOR CONTROLLING TRAFFIC SIGNALS OF TRAFFIC LIGHTS IN SUB-AREA BY USING REINFORCEMENT LEARNING MODEL

CROSS-REFERENCE TO RELATED APPLICATION

This application is based on and claims priority under 35 U.S.C. § 119 to Korean Patent Application No. 10-2022-0084607, filed on Jul. 8, 2022, in the Korean Intellectual Property Office, the disclosure of which is incorporated by reference herein in its entirety.

BACKGROUND

1. Field

The present disclosure relates to methods and apparatuses for controlling traffic signals of traffic lights in a sub-area by using a reinforcement learning model.

2. Description of the Related Art

Recently, as a solution for traffic congestion being aggravated due to the increasing urban traffic volume, optimization of traffic signals is attracting attention.

With the development of the vehicle detection system (VDS), information of roads was collected and traffic signal operation systems corresponding thereto were introduced, however, due to limitations in the range of collectable traffic data and difficulties in optimizing multiple signals, traffic signals are currently being operated in a static manner based on a predefined time of day (TOD).

Recently, with the introduction of artificial intelligence (AI) image analysis technology, it has become possible to obtain higher quality data than that of the related-art VDS through a smart camera in an urban intersection section, but there are still limitations in the method for optimal real-time signal control.

In this regard, various methods for real-time, data-based, optimal traffic signals have been proposed through AI technology, but the current technology can be experimentally operated only in a toy environment, and is inadequate for practical signal control.

The related art described above is technical information that the inventor(s) of the present disclosure has achieved to derive the present disclosure or has achieved during the derivation of the present disclosure, and thus, it cannot be considered that the related art has been published to the public before the filing of the present disclosure.

SUMMARY

Provided are methods and apparatuses for controlling traffic signals of traffic lights in a sub-area by using a reinforcement learning model. Technical objects of the present disclosure are not limited to the foregoing, and other unmentioned objects or advantages of the present disclosure would be understood from the following description and be more clearly understood from the embodiments of the present disclosure. In addition, it would be appreciated that the objects and advantages of the present disclosure can be implemented by means provided in the claims and a combination thereof.

Additional aspects will be set forth in part in the description which follows and, in part, will be apparent from the description, or may be learned by practice of the presented embodiments of the present disclosure.

According to a first aspect of the present disclosure, a method of controlling traffic signals of a plurality of traffic lights in a sub-area by using a neural network model includes: configuring state information of the sub-area by using downstream information for each of a plurality of intersections included in the sub-area, the downstream information being obtained in a current cycle time; inputting the state information to a trained neural network model and obtaining action information of the sub-area by using an output of the trained neural network model, the action information including green times and offsets; and generating coordinated signal value for applying the action information to the plurality of traffic lights in the sub-area in a subsequent cycle time.

According to a second aspect of the present disclosure, an apparatus for controlling traffic signals of traffic lights in a sub-area by using a neural network model includes: a memory storing at least one program; and at least one processor configured to drive a neural network model by executing the at least one program, wherein the at least one processor is further configured to configure state information of the sub-area by using downstream information for each of a plurality of intersections included in the sub-area, the downstream information being obtained in a current cycle time, input the state information to a trained neural network model and obtain an action of the sub-area by using an output of the trained neural network model, the action including green times and offsets, and generate a coordinated signal value for applying the action to the traffic lights in the sub-area in a subsequent cycle time.

According to a third aspect of the present disclosure, a computer-readable recording medium may have recorded thereon a program for executing the method according to the first aspect on a computer.

In addition, other methods and systems for implementing the present disclosure, and a computer-readable recording medium having recorded thereon a computer program for executing the methods may be further provided.

Other aspects, features, and advantages other than those described above will be apparent from the following drawings, claims, and detailed description.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Advantages and features of the present disclosure and a method for achieving them will be apparent with reference to embodiments of the present disclosure described below together with the attached drawings. The present disclosure may, however, be embodied in many different forms and should not be construed as being limited to the embodiments set forth herein, and all changes, equivalents, and substitutes that do not depart from the spirit and technical scope of the present disclosure are encompassed in the present disclosure. These embodiments are provided such that the present disclosure will be thorough and complete, and will fully convey the concept of the present disclosure to those of ordinary skill in the art. In describing the present disclosure, detailed explanations of the related art are omitted when it is deemed that they may unnecessarily obscure the gist of the present disclosure.

Terms used herein are for describing particular embodiments and are not intended to limit the scope of the present disclosure. The singular expression also includes the plural meaning as long as it is not inconsistent with the context. As used herein, terms such as "comprises," "includes," or "has" specify the presence of stated features, numbers, stages, operations, components, parts, or a combination thereof, but do not preclude the presence or addition of one or more other features, numbers, stages, operations, components, parts, or a combination thereof.

Some embodiments of the present disclosure may be represented by block components and various process operations. All or some of such functional blocks may be implemented by various numbers of hardware and/or software components that perform particular functions. For example, functional blocks of the present disclosure may be implemented by using one or more microprocessors, or by using circuit elements for intended functions. For example, the functional blocks of the present disclosure may be implemented by using various programming or scripting languages. The functional blocks may be implemented as an algorithm to be executed by one or more processors. In addition, the present disclosure may employ related-art techniques for electronic configuration, signal processing, and/or data processing, etc. Terms such as "mechanism", "element", "unit", or "component" are used in a broad sense and are not limited to mechanical or physical components.

Also, connection lines or connection members between components illustrated in the drawings are merely illustrative of functional connections and/or physical or circuit connections. In an actual apparatus, connections between components may be represented by various functional connections, physical connections, or circuit connections that are replaceable or added.

Hereinafter, the present disclosure will be described in detail with reference to the accompanying drawings.

Figure 1:
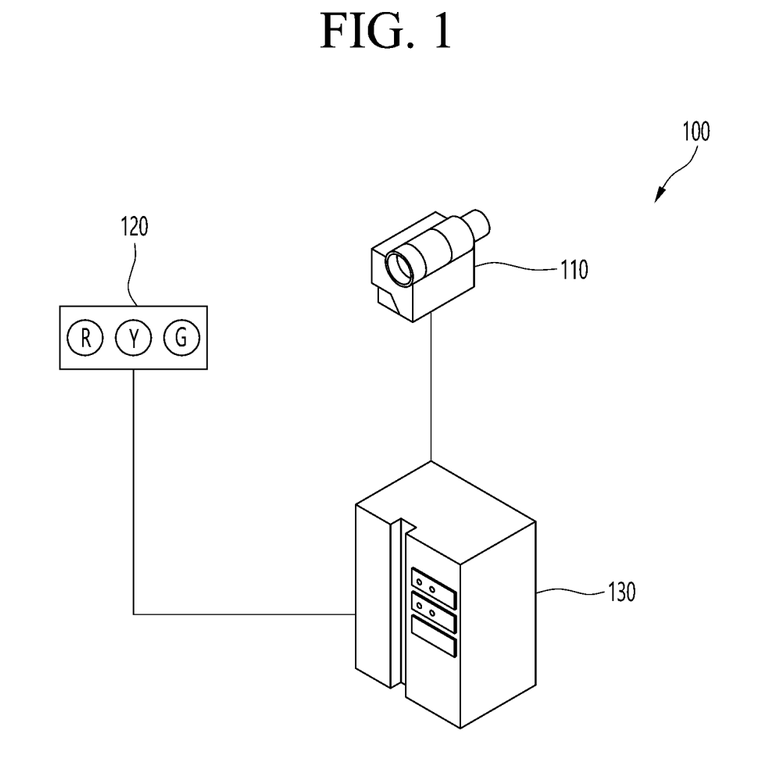
FIG. 1 is a schematic configuration diagram of a traffic signal control system according to an embodiment.

FIG. 1 is a schematic configuration diagram of a traffic signal control system according to an embodiment.

A traffic signal control system 100 includes a photographing device 110, a traffic light 120, and a traffic signal control apparatus 130.

The photographing device 110 may include a camera for capturing an intersection image, and may include a camera capable of capturing an image of a wavelength within a certain range, such as an image of visible light or infrared light. Accordingly, the photographing device 110 may obtain an intersection image by capturing images of different wavelength bands depending on whether the time of image capture is daytime or nighttime, or a current situation. In this case, the photographing device 110 may obtain an intersection image at a preset period.

The photographing device 110 may be installed at an intersection, and depending on an installation height or location, only one photographing device 110 may be provided at one intersection, or a number of photographing devices 110 equal to the number of entries and exits at an intersection may be provided. For example, in a four-leg intersection, four photographing devices 110 configured to obtain intersection images by photographing four entries and exits, respectively, may be provided. In addition, for example, when the four photographing devices 110 obtain the intersection images of the respective four entries and exits, one intersection image may be generated by combining the four intersection images with each other.

The traffic signal control apparatus 130 is installed at an intersection to capture and analyze an image of an entry link of the intersection or an exit link from the intersection. The traffic signal control apparatus 130 may calculate a traffic volume, a queue length, and the like by analyzing an intersection image obtained by the photographing device 110. Information obtained from such calculation may be used by a reinforcement learning model to be described below.

The traffic signal control apparatus 130 may process an intersection image to be analyzable, and identify an object or pixel corresponding to a vehicle in the processed intersection image. To this end, the traffic signal control apparatus 130 may use an artificial neural network to identify an object corresponding to a vehicle or identify whether each pixel is a position corresponding to a vehicle, in the intersection image.

In addition, the traffic signal control apparatus 130 may store programs, data, files, an operating system, and the like necessary for capturing or analyzing an intersection image, and at least temporarily store an intersection image or a result of analysis of the intersection image.

Also, the traffic signal control apparatus 130 may apply a drive signal to the traffic light 120 such that the traffic light 120 installed at an intersection is driven according to a control signal calculated by the traffic signal control apparatus 130. Accordingly, environment information may be updated, and state information obtained by observing an environment may be updated.

Meanwhile, when a plurality of traffic lights 120 are connected to the traffic signal control apparatus 130, the traffic signal control apparatus 130 may determine a green time and an offset for each traffic light 120, and apply a drive signal to allow the traffic light 120 to operate according to the determined green signal time and offset.

Figure 2A:
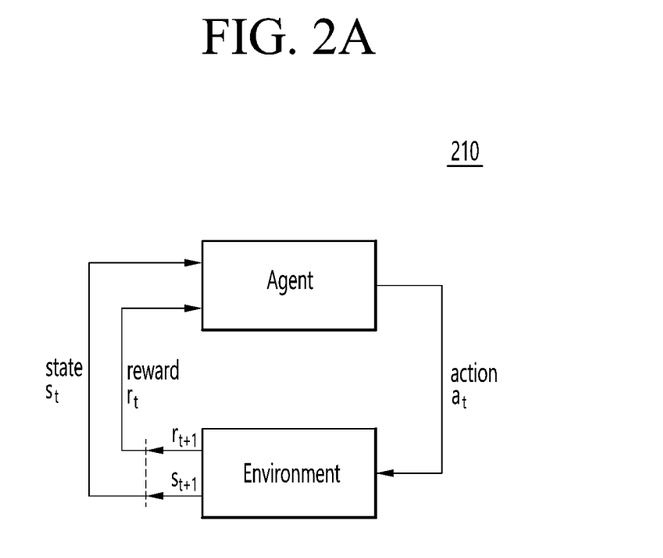
FIGS. 2A and 2B are example diagrams for describing a reinforcement learning model according to an embodiment.
Figure 2B:
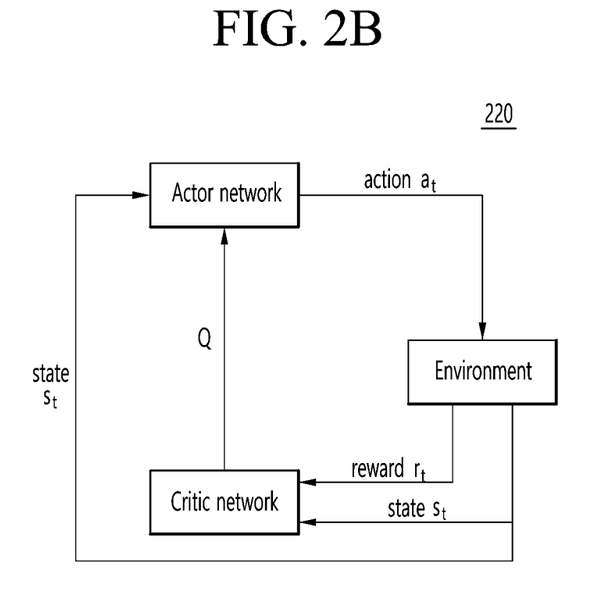

FIGS. 2A and 2B are example diagrams for describing a reinforcement learning model according to an embodiment.

Referring to FIG. 2A, a reinforcement learning model 210 may include elements such as an agent, a state, an environment, an action, and a reward.

The agent refers to a subject to take an action. The action refers to any action that the agent may take. The state refers to a concrete and immediate situation of the agent recognized by the agent. The environment receives a current state and action of the agent and outputs a reward and a next state. The reward is feedback through whether the action of the agent is successful or unsuccessful is determined.

In the present disclosure, the agent may represent a traffic light, the state may represent a traffic volume and a queue length with respect to a downstream of an intersection, the action may represent a green time and an offset of the traffic light, and the reward may represent a stop rate of the intersection.

Referring to FIG. 2B, a reinforcement learning algorithm 220 may be implemented as a policy gradient algorithm. For example, the reinforcement learning algorithm 220 may be implemented as a deep deterministic policy gradient (DDPG) algorithm.

The reinforcement learning algorithm 220 for training a reinforcement learning model may include an actor network and a critic network.

The actor network is an artificial neural network that computes an optimal action $\alpha_i(t)$ for a state $s_i(t)$ of Intersection i, the critic network is an artificial neural network that computes a Q-value to evaluate the adequacy of the action selected by the actor network for the given state $s_i(t)$, and the actor network and the critic network act complementarily and derive an optimal decision.

In detail, the actor network is an artificial neural network that represents a policy function, a policy is a function $\pi: \mathcal{S} \to \mathcal{A}_i$ that determines the action $\alpha_i(t)$ for the state $s_i(t)$ of Intersection i, and reinforcement learning aims to find an optimal policy $$\pi^* = \underset{\pi^*}{\operatorname{argmax}} \, \mathbb{E}_\pi \left[ \sum_t \sum_{i \in N} r_i(t) \right].$$

The actor network is an artificial neural network $\theta^\mu$ (trainable parameters) that outputs an action variable $\alpha_i(t)$ by using a state variable $s_i(t)$ as an input variable, and may be defined by a $\alpha_i(t) = \pi_i(s_i(t)) = \mu(s_i(t)|\theta^\mu)$.

In addition, the critic network is an artificial neural network that represents a Q-function, which is a numerical value of the adequacy of the action $\alpha_i(t)$ taken on the given state $s_i(t)$, based on a reward $r_i(t)$, and the critic network is defined by $Q(s_i(t), \alpha_i(t)) = \mathbb{E}_\pi(\Sigma_{k=0}^\infty \gamma^k r_{t+k}|s_i(t), \alpha_i(t))$. The critic network is an artificial neural network $\theta_Q$ (trainable parameters) that computes a Q-value by using, as input variables, the state variable $s_i(t)$ and $\alpha_i(t) = \mu(s_i(t)|\theta^\mu)$ output with respect thereto by the actor network, and the critic network may be defined by Equation 1 below.

$$Q^{\pi^*}(s_i(t), a_i(t)|\theta^Q) = \mathbb{E}_{\pi^*}\left[\sum_{\tau=t}^\infty \gamma^{t-\tau} \cdot r(\tau)|s_i(t), a_i(t)\right] =$$ [Equation 1]

-continued
$$\mathbb{E}\left[r(t) + \gamma \cdot \underset{a'}{\max} \, Q^{\pi^*}(s_i(t+1), a')|s_i(t), a_i(t), \pi^*\right]$$

The critic network may train the artificial neural network $\theta^Q$ to minimize a loss function defined as a mean-squared error (MSE) for a Q-value. The actor network may then train the artificial neural network $\theta^\mu$ to minimize the sum of Q-values computed by the critic network. By repeating this process, the critic network may approximate the Q-function, and the actor network may approximate the policy function.

Meanwhile, after the training of the reinforcement learning model is completed, the traffic signal control apparatus may perform inference by using only the actor network. The traffic signal control apparatus may input state information of a sub-area to the trained actor network, and obtain action information of the sub-area including green times and offsets, by using an output from the trained actor network. This process will be described below with reference to FIG. 6.

Figure 3:
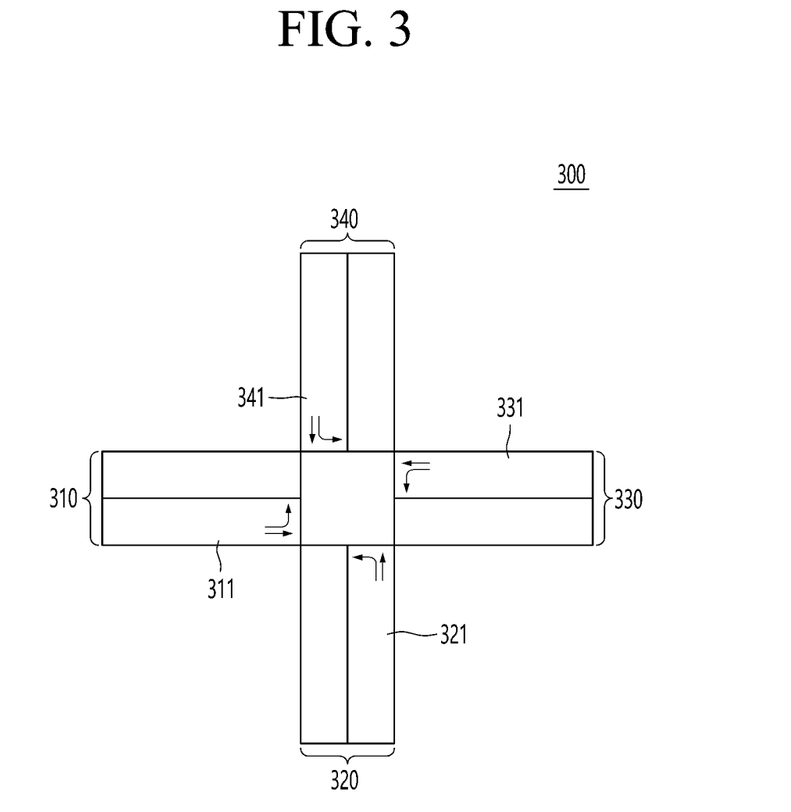
FIG. 3 is an example diagram for describing a traffic volume and a queue length to be used as input variables of a reinforcement learning model, according to an embodiment.

FIG. 3 is an example diagram for describing a traffic volume and a queue length to be used as input variables of a reinforcement learning model, according to an embodiment.

A plurality of access links may be connected to an intersection 300. The number of access links included in the intersection 300 corresponds to the number of legs of the intersection 300. For example, referring to FIG. 3, the intersection 300 corresponds to a four-leg intersection, and thus includes four access links 310, 320, 330, and 340 connected thereto.

In addition, each access link of the intersection 300 includes an upstream and a downstream. The upstream of the access link is a link in which vehicles exit from the intersection 300, and the downstream of the access link is a link in which vehicles enter the intersection 300. Referring to FIG. 3, among the links included in the four access links 310, 320, 330, and 340, links 311, 321, 331, and 341 for entering the intersection 300 correspond to the downstreams of the access links, respectively.

On the other hand, downstream information obtained at the downstreams of the intersection 300 may include traffic volumes and queue lengths.

The traffic volume represents traffic demand for passing through the intersection 300 through a particular access link. The traffic volume is defined as the number of vehicles passing a particular point per hour, the unit of which may be expressed as 'veh/hour'. The traffic signal control apparatus may count the number of vehicles that have passed through a particular access link by using a vehicle detection system (VDS), such as a loop detector, installed near a stop line at the downstream of the access link of the intersection 330.

The queue length refers to a maximum value of a queue of vehicles that stopped to receive a service by a traffic signal at the downstream of the access link of the intersection 300. The queue length may be represented by the length (the unit is m) of the queue. Alternatively, the traffic signal control apparatus may use 'the number of vehicles in queue (veh)' as queue length information, which is obtained by analyzing an intersection image obtained by the photographing device to accurately count the number of waiting vehicles.

In an embodiment, the traffic signal control apparatus may process a traffic volume and a queue length and use the processed traffic volume and queue length as input variables of the reinforcement learning model.

A traffic volume may be affected by geometric and structural characteristics of the road, such as the width and speed limit of the road. That is, the traffic volume is a value implying the geometric and structural characteristics of the road, the traffic information of which is collected, and accordingly, a process of converting the traffic volume into a value not related to the geometric structure is required for generalization. The traffic signal control apparatus may calculate, as a processed traffic volume, 'traffic level', which is a value obtained by dividing a traffic volume by a maximum traffic volume. Hereinafter, the processed traffic volume will be represented by q(t).

Also, a queue length is data obtained from each of a plurality of links included in a road, and it may be difficult for the numerical value of the queue length to reflect a degree of congestion of the entire access link. The traffic signal control apparatus may calculate, as a processed queue length, 'degree of occupation of queue length', which is a value obtained by dividing a queue length by the length of the downstream of an access link to estimate the density. Hereinafter, the processed queue length will be represented by w(t).

Figure 4:
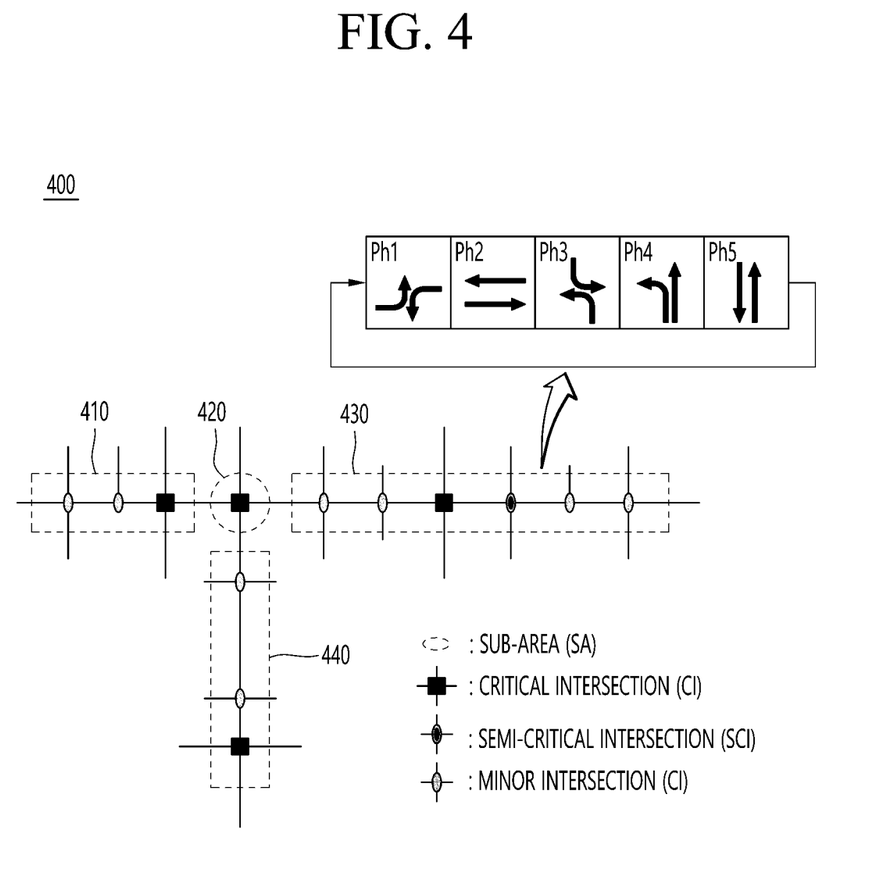
FIG. 4 is an example diagram for describing a sub-area according to an embodiment.

FIG. 4 is an example diagram for describing a sub-area according to an embodiment.

Because adjacent intersections affect each other in a road system composed of signalized intersections (hereinafter, referred to as intersections), it is necessary to perform efficient signal operation of each intersection and coordinated control between the intersections, for seamless traffic communication.

Sub-area is a minimum control unit in which coordinated control is performed, and refers to a group of at least one intersection adjacent to each other. Intersections having similar traffic patterns may be grouped into one sub-area.

Referring to FIG. 4, a road system 400 may be divided into four sub-areas 410, 420, 430, and 440, each of which may include at least one critical intersection.

Traffic signal control of a road system may be performed in such a manner that coordinated signals designed to minimize the number of stops in a major traffic flow in each sub-area are implemented. The variables for controlling a traffic signal include a phase design variable, a phase order variable, and a ring design variable, which are determined at the time of initial intersection design. Referring to FIG. 4, a certain traffic signal has five phases with an order of Ph1 to Ph5, and is configured with a single ring.

In addition, the variables for controlling a traffic signal include a cycle time variable, a green time variable, and an offset variable, which may be dynamically changed according to traffic data.

In the present disclosure, an appropriate green time for each traffic light in a sub-area may be calculated through a reinforcement learning algorithm, based on real-time traffic data collected from a traffic information collection device such as a photographing device or a loop detector, and appropriate offsets for optimization of coordination between intersections may be calculated. Accordingly, in the present disclosure, a vehicle having entered a sub-area may be allowed to pass through a section with the minimum number of stops.

Figure 5:
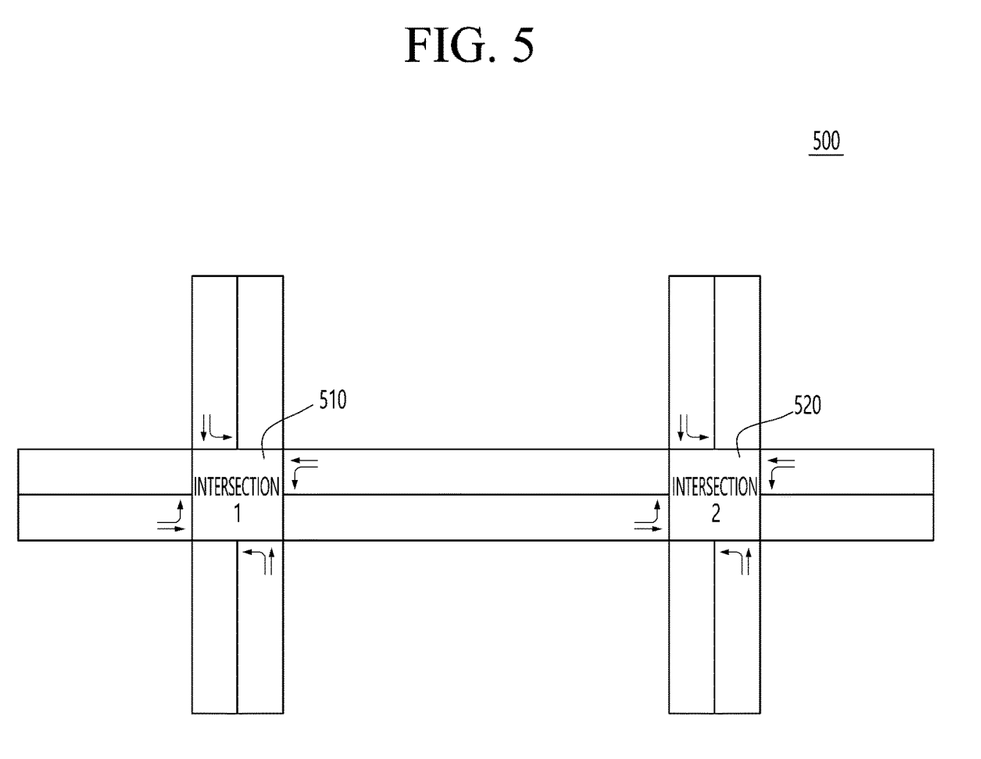
FIG. 5 is an example diagram for describing state information of a reinforcement learning model according to an embodiment.

FIG. 5 is an example diagram for describing state information of a reinforcement learning model according to an embodiment.

For convenience of description, it is assumed that a sub-area 500 includes two intersections i, i.e., intersection 1 510 and intersection 2 520.

Four access links j are connected to each of intersection 1 510 and intersection 2 520, and the traffic signal control apparatus may obtain downstream information of access links j for each intersection i and configure downstream information as state information of the sub-area 500 to be used by the reinforcement learning model.

In detail, the state information is to represent a current traffic situation of each intersection i in the sub-area 500, and is a state of the intersection by which states of access links j of the intersection are collectively represented.

In an embodiment, the downstream information of access links j for each intersection i may include processed traffic volumes and processed queue lengths. As described above with reference to FIG. 3, a processed traffic volume q(t) may be a value obtained by dividing a traffic volume by a maximum traffic volume, and a processed queue length w(t) may be a value obtained by dividing a queue length by the length of a downstream of an access link to estimate the density.

Downstream information $\sigma_j(t)$ of access link j may be represented by $\sigma_j(t)=[w_j(t), q_j(t)]$, which is a vector of normalized values for a processed traffic volume and a processed queue length.

In addition, state information $s_i(t)$ of intersection i may be represented by $s_i(t)=[\sigma_j(t)]_{j \in \mathcal{N}(i)}$, which is a vector obtained by concatenating downstream information of access links j of the intersection. Here, $\mathcal{N}(i)$ denotes a set of indices of access links connected to intersection i.

Through the above-described method, the traffic signal control apparatus may configure state information of a sub-area by using downstream information obtained in a current cycle time for each of a plurality of intersections included in the sub-area. In the present disclosure, state information about all intersections included in a sub-area, rather than a single intersection or some of the intersections included in the sub-area (e.g., critical intersections or semi-critical intersections), may be applied to a reinforcement learning model.

Figure 6:
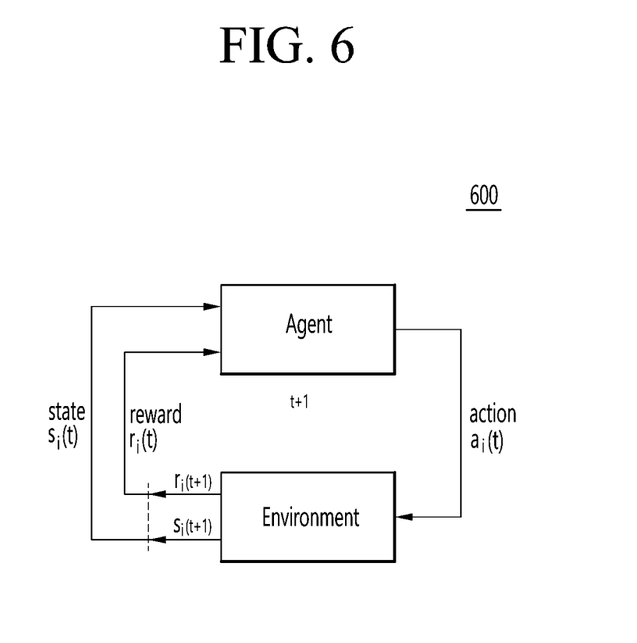
FIG. 6 is a diagram for describing a method of controlling traffic signals of traffic lights in a sub-area by using a reinforcement learning model, according to an embodiment.

FIG. 6 is a diagram for describing a method of controlling traffic signals of traffic lights in a sub-area by using a reinforcement learning model, according to an embodiment.

Referring to FIG. 6, in a reinforcement learning model 600, the agent may refer to traffic lights in the sub-area, the state may refer to processed traffic volumes and processed queue lengths with respect to downstreams of intersections in the sub-area, the action may refer to green times and offsets of the traffic lights, and the reward may refer to stop rates of the intersections.

The traffic signal control apparatus may configure state information indicating a state of each of a plurality of intersections included in the sub-area. The traffic signal control apparatus may configure the state information by using downstream information of a plurality of access links connected to each of the plurality of intersections.

In detail, as described above with reference to FIG. 5, the state information $s_i(t)$ of intersection i may be represented by $s_i(t)=[\sigma_j(t)]_{j \in \mathcal{N}(i)}$, which is a vector obtained by concatenating the downstream information of access links j of the intersection.

In addition, the traffic signal control apparatus may input the state information to a trained reinforcement learning model, and obtain action information of the sub-area including green times and offsets, by using an output from the trained reinforcement learning model.

The action information is a control variable of an optimization problem, and may be used as coordinated signal values for determining an operation scheme of a plurality of traffic lights of each intersection in the sub-area. In order to optimize signal coordination of the plurality of traffic lights in the sub-area by using the action information, the traffic signal control apparatus may determine green times and offsets for a common cycle time.

In detail, when a set of phases of each intersection is $p^i=[p_s^i]_{s=1}^{|P|}$ for a fixed cycle time c in a sub-area, a green time may be defined by Equation 2 below. In Equation 2, a green time $g(p_s^i)$ for a phase $p_s^i$ of signalized intersection i may be defined as an integer between a minimum green time $\underline{g}(p_s^i)$ and a maximum green time $\bar{g}(p_s^i)$.

$$g(p_s^i) \in [\underline{g}(p_s^i), \bar{g}(p_s^i)] \quad \text{[Equation 2]}$$

An offset is a time difference between a cycle time of a reference intersection in a sub-area and a time point at which a cycle time of a target intersection starts, may be represented by $o_i$, and may be defined as a non-negative integer in a range of $o_i \in (0, +c_i)$.

The action information $\alpha_i(t)$ for the respective intersections in the sub-area, which includes the green times and the offsets, may be defined by Equation 3 below.

$$\alpha_i(t)=[[gp_s^i(t)]_{s=1}^{|P|}, o_i(t)] \quad \text{[Equation 3]}$$

Meanwhile, the traffic signal control apparatus may configure reward information by using a stop rate calculated based on a processed traffic volume and a processed queue length. The reward information may be information to be used as input data of the critic network in training the reinforcement learning model described above with reference to FIG. 2B.

The reward information functions as an objective function of an optimization problem, and the traffic signal control apparatus aims at coordination optimization of a sub-area, and thus may configure the reward information as an objective function to minimize the total number of stops of vehicles passing through the sub-area.

When the region in which a photographing device is installed in an intersection does not include the entire region of a traffic signal control section, it may be difficult to directly measure the number of stops in the entire section. To overcome this, the traffic signal control apparatus may define a reward variable as a stop rate observable at a downstream of each access link of the intersection.

In detail, the stop rate of each access link j of intersection i may be defined by $$ts_j(t) = \frac{w_j(t)}{q_j(t)}.$$

The stop rate $ts_j(t)$ is a value obtained by dividing a queue length observed in a certain cycle time at the downstream of each access link j by a traffic volume, and may represent a ratio of vehicles that have experienced a stop among vehicles passing through during the cycle time. The traffic signal control apparatus may calculate an arithmetic mean of stop rates obtained at downstreams of the respective links, and define the arithmetic mean as a reward variable of intersection i, and the reward variable may be defined by Equation 4 below.

$$r_i(t) = \frac{\sum_j ts_j(t)}{|N(i)|} \quad \text{[Equation 4]}$$

The traffic signal control apparatus may train a reinforcement learning model based on state information, action information, and reward information for each of a plurality of intersections included in a sub-area. That is, the traffic signal control apparatus may input, to the trained reinforcement learning model 600, a state information set, which is a set of state information for all access links related to the plurality of intersections included in the sub-area, and obtain a single action information set, which is output from the reinforcement learning model 600 based on a predetermined optimal policy. Here, the action information set includes action information for traffic lights of all access links related to the plurality of intersections included in the sub-area. In addition, the traffic signal control apparatus may generate coordinated signal values based on the single action information set output from the reinforcement learning model 600, and apply the coordinated signal values to the intersections in the sub-area from which the state information has been collected.

Figure 7:
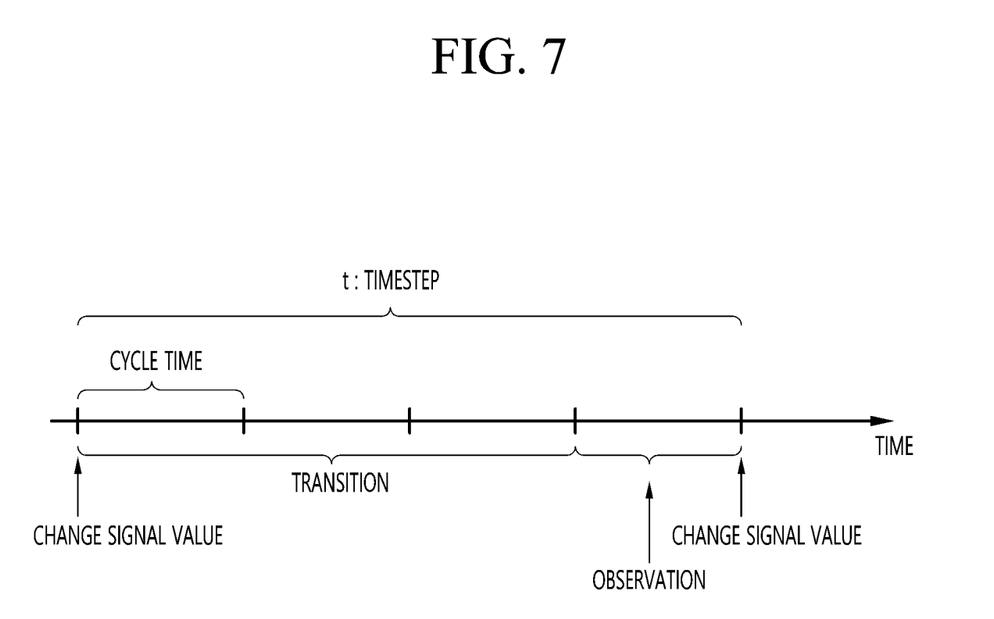
FIG. 7 is an example diagram for describing a method of generating coordinated signal values and controlling operation of a traffic light, according to an embodiment.

FIG. 7 is an example diagram for describing a method of generating coordinated signal values and controlling operation of a traffic light, according to an embodiment.

The traffic signal control apparatus may input, to a completely trained actor network, state information of a sub-area obtained in a current cycle time, and obtain action information of the sub-area including green times and offsets, by using an output from the trained actor network.

In addition, the traffic signal control apparatus may generate coordinated signal values for applying the action information obtained from the trained actor network, to traffic lights in the sub-area in a subsequent cycle time.

In an embodiment, the traffic signal control apparatus may determine whether an offset included in the action information is within a preset absolute value range.

In response to an offset being set to be within the preset absolute value range, the traffic signal control apparatus may generate a coordinated signal value to apply the offset to the corresponding traffic light in the sub-area in the subsequent cycle time. The preset absolute value range may include values within a range of −17% in the negative direction or +33% in the positive direction, based on a current cycle time, but is not limited thereto. For example, when a current cycle time t is 150 seconds and an offset of the action information obtained from the actor network is 30 seconds, the offset is within a range of % in the positive direction, and thus the traffic signal control apparatus may immediately apply the offset to the corresponding traffic light in the sub-area in the subsequent cycle time t+1.

On the other hand, in response to an offset being set to be out of the preset absolute value range, the traffic signal control apparatus may generate a coordinated signal value to apply the offset to the corresponding traffic light in the sub-area during a transition process configured with a plurality of subsequent cycle times. When an offset is set to be out of the preset absolute value range, a sudden change in traffic flow may occur when the offset is immediately applied in the subsequent cycle time, and thus, in order to prevent this, in the present disclosure, a newly set offset may be gradually applied during several cycles through a transition process. For example, the traffic signal control apparatus may gradually apply a new offset during one to three cycles according to how far the offset is out of the preset absolute value range.

FIG. 7 illustrates a timestep set in consideration of a transition process. When an offset is set to be out of the preset absolute value range, the traffic signal control apparatus generates a coordinated signal value to apply the offset to a corresponding traffic light in a sub-area during a transition process configured with a plurality of subsequent cycle times, and the operation environment of the traffic light may be unstable during the transition process.

Accordingly, instead of, at every cycle time, obtaining action information from the actor network and applying the obtained action information in the subsequent cycle time, the traffic signal control apparatus may omit, during the transition process, the obtaining of the action information, and configure, after the transition process, state information of the sub-area by using downstream information obtained in the subsequent cycle time (i.e., an observation process).

Accordingly, in the present disclosure, it is possible to achieve traffic signal optimization by obtaining more stable output values (i.e., action information) from the actor network.

Figure 8:
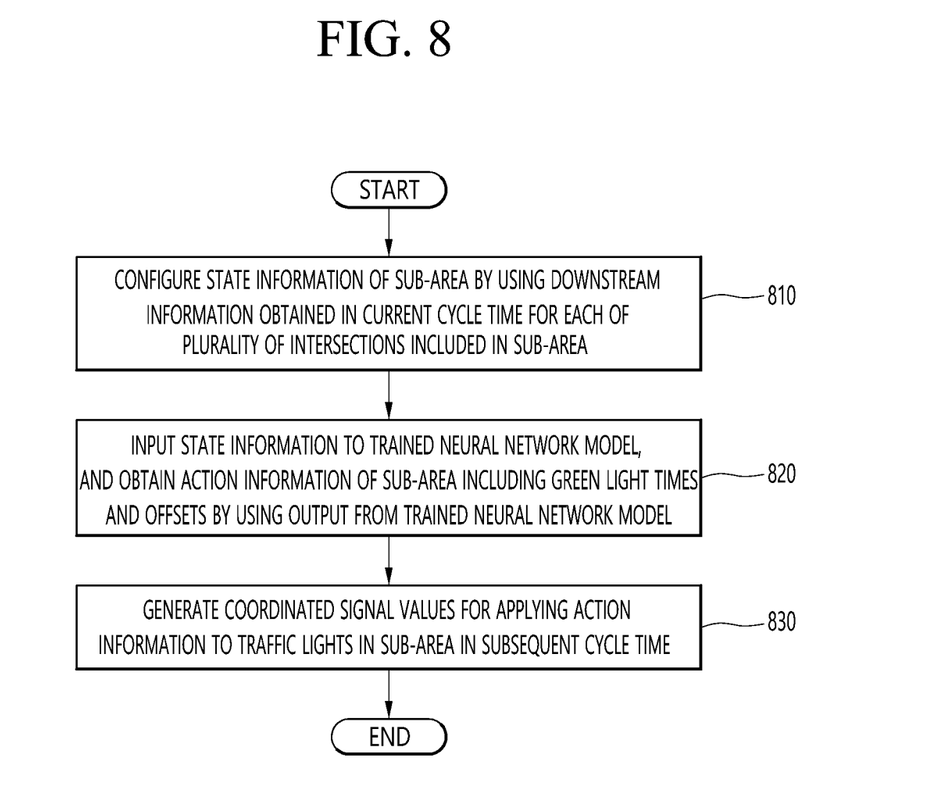
FIG. 8 is a flowchart illustrating a method of controlling traffic signals of traffic lights in a sub-area by using a neural network model, according to an embodiment.

FIG. 8 is a flowchart illustrating a method of controlling traffic signals of traffic lights in a sub-area by using a neural network model, according to an embodiment.

Referring to FIG. 8, in operation 810, a processor may configure state information of a sub-area by using downstream information obtained in a current cycle time for each of a plurality of intersections included in the sub-area.

In an embodiment, the downstream information may include a processed traffic volume and a processed queue length, the processed traffic volume may be calculated based on a traffic volume defined as the number of vehicles passing a particular point per a preset time period and a maximum traffic volume not related to the geometric structure of a road, and the processed queue length may be calculated based on the number of waiting vehicles and the length of a downstream.

In operation 820, the processor may input the state information to a trained neural network model, and obtain action information of the sub-area including green times and offsets, by using an output from the trained neural network model.

The trained neural network model may be an actor network, and may be trained based on reinforcement learning using the actor network and a critic network in a learning phase.

In an embodiment, the green time may be set to be between a minimum green time and a maximum green time, and the offset may be set to be within an absolute value range of a fixed cycle time.

In operation 830, the processor may generate coordinated signal values for applying the action information to traffic lights in the sub-area in a subsequent cycle time.

The state information may be configured as a state information set, which is a set of state information about each of a plurality of intersections included in the sub-area, the action information may be configured as a action information set, which is a set of action information for each of a plurality of traffic lights in the sub-area, and the coordinated signal values may be applied to the plurality of traffic lights in the sub-area at once, respectively.

In response to an offset being set to be within a preset absolute value range, the processor may generate a coordinated signal value to apply the offset to the corresponding traffic light in the sub-area in the subsequent cycle time.

In response to an offset being set to be out of the preset absolute value range, the processor may generate a coordinated signal value to apply the offset to the corresponding traffic light in the sub-area during a transition process configured with a plurality of subsequent cycle times.

In an embodiment, the processor may configure state information of the sub-area by using downstream information obtained in a subsequent cycle time after the transition process.

The processor may configure reward information by using a stop rate calculated based on a processed traffic volume and a processed queue length, and train a reinforcement learning model based on the state information, the action information, and the reward information.

In an embodiment, the neural network model is an actor network, and may be trained based on reinforcement learning using a critic network. The actor network may be trained by using state information as input data and action information as output data, and the critic network may be trained by using action information output from the actor network as input data and reward information as output data.

Figure 9:
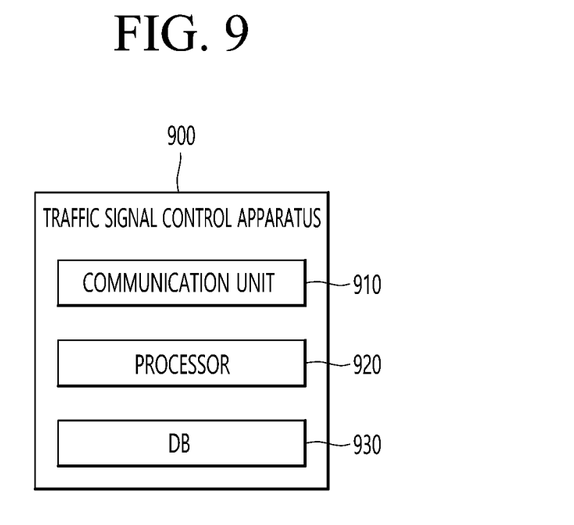
FIG. 9 is a block diagram of a traffic signal control apparatus according to an embodiment.

FIG. 9 is a block diagram of a traffic signal control apparatus according to an embodiment.

Referring to FIG. 9, a traffic signal control apparatus 900 may include a communication unit 910, a processor 920, and a database (DB) 930. In the traffic signal control apparatus 900 of FIG. 9, only components related to an embodiment are illustrated. Therefore, it would be understood by those of skill in the art that other general-purpose components may be further included in addition to those illustrated in FIG. 9.

The communication unit 910 may include one or more components for performing wired/wireless communication with an external server or an external device. For example, the communication unit 910 may include at least one of a short-range communication unit (not shown), a mobile communication unit (not shown), and a broadcast receiver (not shown).

The DB 930 is hardware for storing various data processed by the traffic signal control apparatus 900, and may store a program for the processor 920 to perform processing and control.

The DB 930 may include random-access memory (RAM) such as dynamic RAM (DRAM) or static SRAM, read-only memory (ROM), electrically erasable programmable ROM (EEPROM), a compact disc-ROM (CD-ROM), a Blu-ray or other optical disk storage, a hard disk drive (HDD), a solid-state drive (SSD), or flash memory.

The processor 920 controls the overall operation of the traffic signal control apparatus 900. For example, the processor 920 may execute programs stored in the DB 930 to control the overall operation of an input unit (not shown), a display (not shown), the communication unit 910, the DB 930, and the like. The processor 920 may execute programs stored in the DB 930 to control the operation of the traffic signal control apparatus 900.

The processor 920 may control at least some of the operations of the traffic signal control apparatus 900 described above with reference to FIGS. 1 to 8. The traffic signal control apparatus 900 may be the same as the system 100 of FIG. 1 or may be implemented as an apparatus that performs some of the operations of the system 100.

The processor 920 may be implemented by using at least one of application-specific integrated circuits (ASICs), digital signal processors (DSPs), digital signal processing devices (DSPDs), programmable logic devices (PLDs), field-programmable gate arrays (FPGAs), controllers, microcontrollers, microprocessors, and other electrical units for performing functions.

In an embodiment, the traffic signal control apparatus 900 may be a mobile electronic device. For example, the traffic signal control apparatus 900 may be implemented as a smart phone, a tablet personal computer (PC), a PC, a smart television (TV), a personal digital assistant (PDA), a laptop computer, a media player, a navigation system, a camera-equipped device, and other mobile electronic devices. In addition, the traffic signal control apparatus 900 may be implemented as a wearable device having a communication function and a data processing function, such as a watch, glasses, a hair band, a ring, or the like.

In another embodiment, the traffic signal control apparatus 900 may be a server located outside a vehicle. The server may be implemented as a computer device or a plurality of computer devices that provide a command, code, a file, content, a service, and the like by performing communication through a network. The server may receive data necessary for classifying an event of an image from devices mounted on vehicles, and classify the event of the image based on the received data.

In another embodiment, a process performed by the traffic signal control apparatus 900 may be performed by at least some of a mobile electronic device, an electronic device embedded in a vehicle, and a server located outside a vehicle.

Embodiments of the present disclosure may be implemented as a computer program that may be executed through various components on a computer, and such a computer program may be recorded in a computer-readable medium. In this case, the medium may include a magnetic medium such as a hard disk, a floppy disk, or a magnetic tape, an optical recording medium such as a CD-ROM or a DVD, a magneto-optical medium such as a floptical disk, and a hardware device specially configured to store and execute program instructions, such as ROM, RAM, or flash memory.

Meanwhile, the computer program may be specially designed and configured for the present disclosure or may be well-known to and be usable by those of ordinary skill in the art of computer software. Examples of the computer program may include not only machine code, such as code made by a compiler, but also high-level language code that is executable by a computer by using an interpreter or the like.

According to an embodiment, the method according to various embodiments disclosed herein may be included in a computer program product and provided. The computer program product may be traded between a seller and a purchaser as a commodity. The computer program product may be distributed in the form of a machine-readable storage medium (e.g., compact disk read only memory (CD-ROM)), or may be distributed online (e.g., downloaded or uploaded) through an application store (e.g., Play Store™) or directly between two user devices. In the case of online distribution, at least a portion of the computer program product may be temporarily stored in a machine-readable storage medium such as a manufacturer's server, an application store's server, or a memory of a relay server.

The operations of the methods described herein may be performed in any suitable order unless otherwise indicated herein or otherwise clearly contradicted by context. The present disclosure is not limited to the described order of the operations. The use of any and all examples, or example language (e.g., "and the like") provided herein, is intended merely to better illuminate the present disclosure and does not pose a limitation on the scope of the present disclosure unless otherwise claimed. In addition, various modifications, combinations, and adaptations will be readily apparent to those skilled in this art without departing from the following claims and equivalents thereof.

Accordingly, the spirit of the present disclosure should not be limited to the above-described embodiments, and all modifications and variations which may be derived from the meanings, scopes and equivalents of the claims should be construed as failing within the scope of the present disclosure.

According to the embodiments disclosed herein, an appropriate green time for each traffic light in a sub-area may be calculated through a reinforcement learning algorithm, based on real-time traffic data collected from a traffic information collection device, and appropriate offsets for optimization of coordination between intersections may be calculated in real time. Accordingly, in the present disclosure, a vehicle having entered a sub-area may be allowed to pass through a section with the minimum number of stops.

Furthermore, in the present disclosure, by applying, to a reinforcement learning model, state information about all intersections included in a sub-area, rather than a single intersection or some of the intersections included in the sub-area (e.g., critical intersections or semi-critical intersections), optimal decision-making may be performed in real time, which is suitable for real-time signal control.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A method of controlling traffic signals of a plurality of traffic lights in a sub-area by using a neural network model, the method comprising:
   configuring state information of the sub-area by using downstream information for a current cycle time, wherein the downstream information is configured for each of a plurality of intersections included in the sub-area;
   obtaining action information including green times and offsets for the sub-area by inputting the state information to a trained neural network model;
   determining whether an offset is set to within a preset absolute value range; and
   generating a coordinated signal value for applying the action information to the plurality of traffic lights in the sub-area during a transition process configured with a plurality of subsequent cycle times, in response to determining that the offset is set to a value out of the preset absolute value range,
   wherein the neural network model is trained using a reinforcement learning algorithm which is based on the action information, the state information, and reward information, and
   wherein the reward information for each intersection is defined as an arithmetic mean of stop rate obtained at downstream of each of a plurality of links of intersection, each of the stop rates is a value obtained by diving a processed queue length by a processed traffic volume of the downstream of one of the plurality of links of the intersection.

2. The method of claim 1, wherein
   the downstream information includes the processed traffic volume and the processed queue length,
   the processed traffic volume is calculated based on a traffic volume defined as a number of vehicles passing a particular point per hour and a maximum traffic volume not related to a geometric structure of a road, and the processed queue length is calculated based on a number of waiting vehicles and a length of a downstream.

3. The method of claim 1, further comprising configuring state information of the sub-area by using downstream information obtained in a subsequent cycle time after the transition process, in response to determining that the offset is set to a value out of the preset absolute value range.

4. The method of claim 1, wherein the coordinated signal value is generated to gradually apply the action information to the plurality of traffic lights in the sub-area during the transition process configured with the plurality of subsequent cycle times, in response to determining that the offset is set to a value out of the preset absolute value range.

5. The method of claim 1, wherein a number of subsequent cycle times in the transition process is determined based on an extent to which the offset exceeds the preset absolute value range.

6. The method of claim 1, further comprising generating a coordinated signal value for applying the action information to the plurality of traffic lights in the sub-area in an earliest cycle time among the plurality of subsequent cycle times, in response to determining that the offset is set to a value within the preset absolute value range.

7. The method of claim 1, wherein the reinforcement learning algorithm comprises a deep deterministic policy gradient (DDPG) algorithm, and the neural network model is trained to output the action information, wherein the green times and the offsets minimize a total number of stops of vehicles passing through the sub-area.

8. The method of claim 1, wherein a green time is set to a value between a minimum green time and a maximum green time, and the offset is set to a value within an absolute value range of a fixed cycle time.

9. The method of claim 1, wherein the reward information is defined by using a stop rate representing a ratio of vehicles that have experienced a stop among vehicles passing through during a specific cycle time.

10. The method of claim 1, wherein the neural network model is an actor network, and is trained based on reinforcement learning including a critic network, the actor network is trained by using the state information as input data and the action information as output data, to determine an optimal policy for controlling the traffic signals of the plurality of traffic lights in the sub-area, and the critic network is trained by using, as input data, action information output from the actor network and using, as output data, the reward information for evaluating adequacy of the action information output from the actor network.

11. An apparatus for controlling traffic signals of a plurality of traffic lights in a sub-area by using a neural network model, the apparatus comprising:

a memory storing at least one program; and at least one processor configured to drive the neural network model by executing the at least one program, wherein the at least one processor is further configured to configure state information of the sub-area by using downstream information for each of a plurality of intersections included in the sub-area, the downstream information being obtained in a current cycle time, input the state information into trained neural network model and obtain an action of the sub-area by using an output of the trained neural network model, the action including green times and offsets, determine whether an offset is set to within a preset absolute value range; and generate a coordinated signal value for applying action information to the plurality of traffic lights in the sub-area during a transition process configured with a plurality of subsequent cycle times, in response to determining that the offset is set to a value out of the preset absolute value range, wherein the neural network model is trained using a reinforcement learning algorithm which is based on the action information, the state information, and reward information, and wherein the reward information for each intersection is defined as arithmetic mean of stop rates obtained at downstream of each of a plurality of links of the intersection, each of the stop rates is a value obtained by dividing a processed queue length by a processed traffic volume of the downstream of one of the plurality links of the intersection.

12. A non-transitory computer-readable recording medium that stores a program that, when executed by a computer, configures the computer to:

configure state information of a sub-area by using downstream information for a current cycle time, wherein the downstream information is configured for each of a plurality of intersections included in the sub-area, obtain action information including green times and offsets for the sub-area by inputting the state information to a trained neural network model, determine whether an offset is within a preset absolute value range; and generate a coordinated signal value for applying the action information to a plurality of traffic lights in the sub-area during a transition process configured with a plurality of subsequent cycle times, in response to determining that the offset is set to a value out of the preset absolute value range, wherein the neural network model is trained using a reinforcement learning algorithm which is based on the action information, the state information, and reward information, and wherein the reward information for each intersection is defined as arithmetic mean of stop rates obtained at downstream of each of a plurality of links of the intersection, each of the stop rates is a value obtained by dividing a processed queue length by a processed traffic volume of the downstream of one of the plurality links of the intersection.

* * * * *